United States Patent
Ji

(10) Patent No.: US 11,989,399 B2
(45) Date of Patent: May 21, 2024

(54) DISPLAY METHOD AND ELECTRONIC DEVICE

(71) Applicant: VIVO MOBILE COMMUNICATION CO., LTD., Dongguan (CN)

(72) Inventor: Sheng Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/849,582

(22) Filed: Jun. 24, 2022

(65) Prior Publication Data

US 2022/0326843 A1 Oct. 13, 2022

Related U.S. Application Data

(63) Continuation of application No. PCT/CN2020/138957, filed on Dec. 24, 2020.

(30) Foreign Application Priority Data

Dec. 27, 2019 (CN) .......................... 201911374453.X

(51) Int. Cl.
*G06F 3/04845* (2022.01)
*G06F 3/04815* (2022.01)

(52) U.S. Cl.
CPC ...... *G06F 3/04845* (2013.01); *G06F 3/04815* (2013.01)

(58) Field of Classification Search
CPC ............. G06F 3/04845; G06F 3/04815; G06F 3/0481; G06F 3/0485; G06F 3/04883; G06F 3/0412; G02F 1/13338; H10K 59/40

See application file for complete search history.

(56) References Cited

U.S. PATENT DOCUMENTS

| 2010/0039401 A1 | 2/2010 | Li et al. |
| 2010/0214319 A1 | 8/2010 | Nakano |
| 2011/0231796 A1 | 9/2011 | Vigil |

(Continued)

FOREIGN PATENT DOCUMENTS

| CN | 101650629 A | 2/2010 |
| CN | 102713812 A | 10/2012 |

(Continued)

OTHER PUBLICATIONS

Extended European Search Report issued in related European Application No. 20907887.2, dated May 4, 2023, 8 pages.

(Continued)

*Primary Examiner* — Ryan R Yang
(74) *Attorney, Agent, or Firm* — IPX PLLC

(57) ABSTRACT

A display method and an electronic device are provided and relate to the field of communications technologies. The method includes: receiving, by an electronic device, a first input from a user in a case that a first image in a first type of image is displayed; in response to the first input, displaying, by the electronic device, a second image in a second type of image, where a type of the first type of image is different from that of the second type of image; receiving, by the electronic device, a second input from the user; and in response to the second input, displaying a third image by the electronic device, where the third image is an image, adjacent to the second image, in the second type of image.

20 Claims, 2 Drawing Sheets

(56) References Cited

U.S. PATENT DOCUMENTS

2016/0300321 A1  10/2016  Naya
2017/0039322 A1* 2/2017  Reicher ................ G06F 16/583

FOREIGN PATENT DOCUMENTS

| CN | 102760027 | A | 10/2012 |
| CN | 103116631 | A | 5/2013 |
| CN | 103838583 | A | 6/2014 |
| CN | 104978115 | A | 10/2015 |
| CN | 105389374 | A | 3/2016 |
| CN | 107229371 | A | 10/2017 |
| CN | 107608604 | A | 1/2018 |
| CN | 111142731 | A | 5/2020 |
| JP | 2004153426 | A | 5/2004 |
| JP | 2010218544 | A | 9/2010 |
| JP | 201595760 | A | 5/2015 |

OTHER PUBLICATIONS

International Search Report issued in corresponding International Application No. PCT/CN2020/138957, dated Mar. 22, 2021, 4 pages.
First Office Action issued in related Chinese Application No. 201911374453.X, dated Nov. 3, 2020, 11 pages.
Second Office Action issued in related Chinese Application No. 201911374453.X, dated Apr. 8, 2021, 9 pages.
Notice of reason of refusal issued in related Japanese Application No. 2022-537042, dated Jul. 25, 2023, 4 pages.
Notice of reason of refusal issued in related Japanese Application No. 2022-537042, mailed Jan. 16, 2024, 4 pages.
Link up, starting from scratch iPhone 11 Pro Smart Guide Softbank fully compatible version, 1st edition, Japan, Gijutsu Hyoronsha Co., Ltd., Nov. 15, 2019, p. 161.

* cited by examiner

DISPLAY METHOD AND ELECTRONIC DEVICE

CROSS-REFERENCE TO RELATED APPLICATIONS

This application is a continuation of International Application No. PCT/CN2020/138957, filed on Dec. 24, 2020, which claims priority to Chinese Patent Application No. 201911374453.X, filed on Dec. 27, 2019. The entire contents of each of the above-identified applications are expressly incorporated herein by reference.

TECHNICAL FIELD

Embodiments of the present disclosure relate to the field of communications technologies, and in particular, to a display method and an electronic device.

BACKGROUND

With the development of communications technology, users use electronic devices more and more frequently, for example, users often use electronic devices to view images.

Generally, an electronic device displays images in sequence, and a user can browse a previous image or a following image of a current image in sequence.

However, according to the foregoing image display manner, there is a problem that a manner of viewing images is not flexible enough. For example, when an image displayed by the electronic device that is in a portrait state is an image with a better landscape display effect, the user needs to control the electronic device to switch to a landscape state when automatic rotation is turned on, to view the image with a better landscape display effect. If the next image of a horizontal screen image is a vertical screen image, the electronic device usually reduces a display size of the vertical screen image and rotates the image to fit the width of the screen. If the user needs to view an image with a better portrait display effect, the user needs to switch the electronic device from the landscape state to the portrait state again.

SUMMARY

Embodiments of the present disclosure provide a display method and an electronic device.

According to a first aspect, an embodiment of the present disclosure provides a display method, where the method includes: receiving a first input from a user in a case that a first image in a first type of image is displayed; in response to the first input, displaying a second image in a second type of image, where a type of the first type of image is different from that of the second type of image; receiving a second input from the user; in response to the second input, displaying a third image, where the third image is an image, adjacent to the second image, in the second type of image.

According to a second aspect, an embodiment of the present disclosure further provides an electronic device, where the electronic device includes: a receiving module and a display module; the receiving module is configured to receive a first input from a user in a case that a first image in a first type of image is displayed; the display module is configured to: in response to the first input received by the receiving module, display a second image in a second type of image, where a type of the first type of image is different from that of the second type of image; the receiving module is further configured to receive a second input from the user; and the display module is further configured to: in response to the second input received by the receiving module, display a third image, where the third image is an image, adjacent to the second image, in the second type of image.

According to a third aspect, an embodiment of the present disclosure provides an electronic device, including a processor, a memory, and a computer program stored in the memory and capable of running on the processor. When the computer program is executed by the processor, the steps of the display method according to the first aspect are implemented.

According to a fourth aspect, an embodiment of the present disclosure provides a computer-readable storage medium. The computer-readable storage medium stores a computer program, and when the computer program is executed by a processor, steps of the display method according to the first aspect are implemented.

In this embodiment of the present disclosure, first, an electronic device receives a first input from a user in a case that a first image in a first type of image is displayed; and in response to the first input, the electronic device may display a second image in a second type of image. Then, the electronic device receives a second input from the user, and in response to the second input, the electronic device displays a third image. A type of the first type of image is different from that of the second type of image, and the third image is an image, adjacent to the second image, in the second type of image. Therefore, the electronic device may be triggered through the first input to display the second type of image, so that during browsing of images, if the second type of image needs to be viewed separately, the electronic device may be triggered through the first input to display the second type of image. For example, when a user browses images, if the user only wants to browse horizontal screen images when browsing images, and a vertical screen image is currently displayed, the electronic device may be triggered to continuously display horizontal screen images; and if the user only wants to browse vertical screen images when browsing images, and a horizontal screen image is currently displayed, the electronic device may be triggered to continuously display vertical screen images. In this way, the user can quickly browse the horizontal screen images when the electronic device is in a landscape state (automatic rotation is turned on), and the user can quickly browse the vertical screen images when the electronic device is in a portrait state. A display manner is more flexible, improving user's experience of browsing images.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be noted that "/" in this specification represents or. For example, A/B may represent A or B. "and/or" in this specification merely describes an association relationship between associated objects, and indicates that there may be three relationships. For example, A and/or B may represent that there are three cases: There is only A, there are both A and B, and there is only B. The term "a plurality of" refers to two or more.

In the specification and claims of the present disclosure, the terms such as "first" and "second" are used to distinguish between different objects, but are not used to describe a particular sequence of the objects. For example, a first image, a second image, and the like are used to distinguish between different images, but are not used to describe a particular sequence of the images.

It should be noted that, in the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The electronic device in the embodiments of the present disclosure may be an electronic device with an operating system. The operating system may be an Android operating system, or may be an iOS operating system, or may be another possible operating system, which is not specifically limited in the embodiments of the present disclosure.

The following uses the Android operating system as an example to describe a software environment to which the display method provided in the embodiments of the present disclosure is applied.

Figure 1:
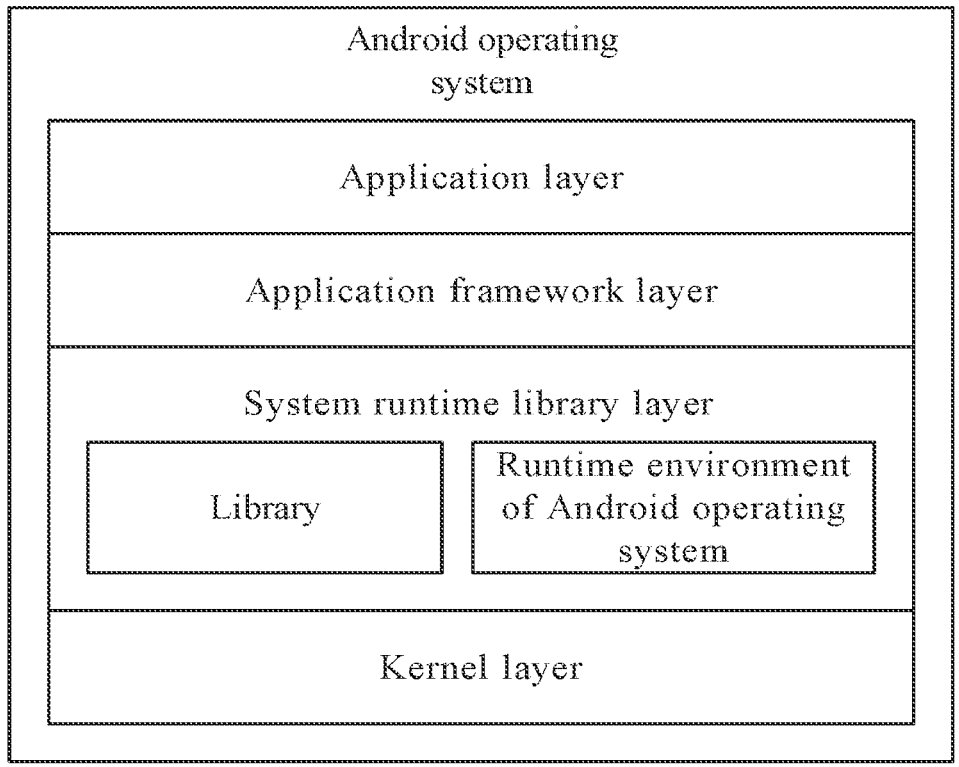
FIG. 1 is a schematic structural diagram of a possible Android operating system according to an embodiment of the present disclosure.

FIG. 1 is a schematic structural diagram of a possible Android operating system according to an embodiment of the present disclosure. In FIG. 1, the architecture of the Android operating system includes four layers: an application layer, an application framework layer, a system runtime library layer, and a kernel layer (specifically, may be a Linux kernel layer).

The application layer includes various applications (including a system application and a third-party application) in the Android operating system.

The application framework layer is an application framework, and a developer may develop some applications based on the application framework layer following a rule of developing the application framework.

The system runtime library layer includes a library (also referred to as a system library) and a runtime environment of the Android operating system. The library mainly provides various resources required for the Android operating system. The runtime environment of the Android operating system is used to provide the Android operating system with a software environment.

The kernel layer is an operating system layer of the Android operating system, and is the lowest layer of software levels of the Android operating system. The kernel layer provides the Android operating system with a core system service and a hardware-related driver based on the Linux kernel.

The Android operating system is used as an example. In the embodiments of the present disclosure, a developer may develop, based on the system architecture of the Android operating system shown in FIG. 1, a software program to implement the display method provided in the embodiments of the present disclosure, so that the display method can run based on the Android operating system shown in FIG. 1. That is, a processor or the electronic device may run the software program in the Android operating system to implement the display method provided in the embodiments of the present disclosure.

Figure 2:
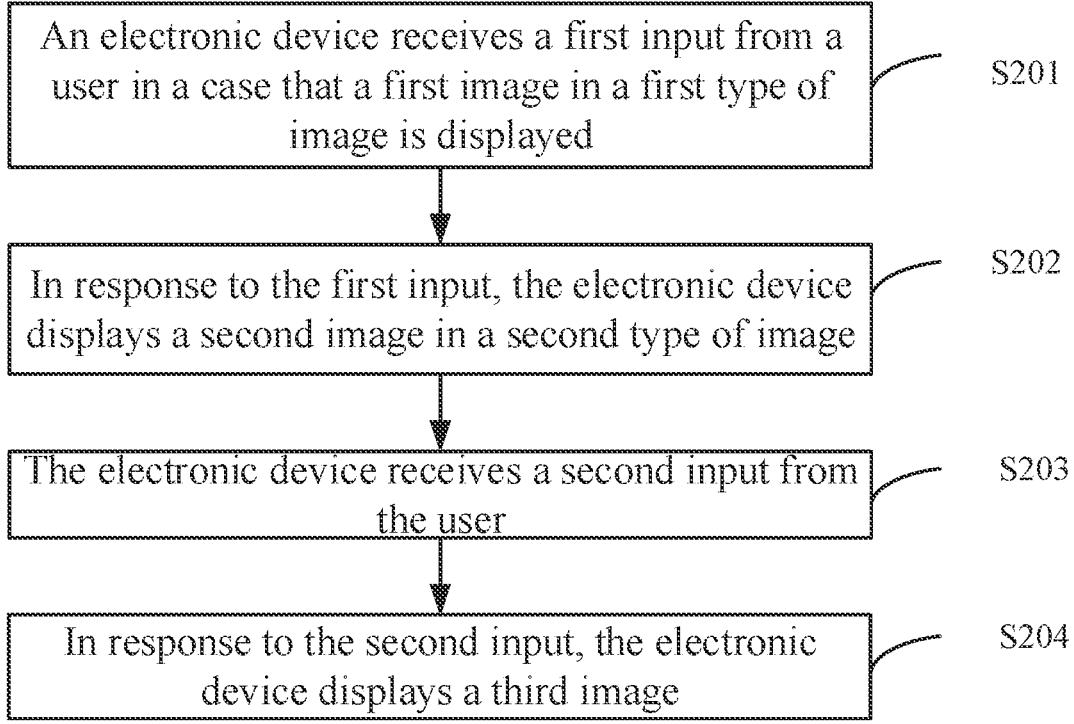
FIG. 2 is a schematic flowchart of a display method according to an embodiment of the present disclosure.

The display method of the embodiments of the present disclosure is described below with reference to FIG. 2. FIG. 2 is a schematic flowchart of a display method according to an embodiment of the present disclosure. As shown in FIG. 2, the display method includes steps S201 to S204:

S201. An electronic device receives a first input from a user in a case that a first image in a first type of image is displayed.

The first input is an input corresponding to a second type of image, and the first input may be used to trigger the electronic device to display the second type of image.

Exemplarily, the first input may be a slide input or a tap input. For example, in a case where the first input is the slide input, the first input may be a single-finger slide input performed by the user on a screen from top to bottom, or may be a single-finger slide input performed by the user on a screen from bottom to top, or may be a two-finger slide input performed by the user on a screen from left to right, or may be a slide input performed by the user on a screen from right to left. In the case where the first input is a tap input, the first input may be a double-tap input performed by a user in the top area of a screen, or may be a double-tap input performed by a user in the bottom area of a screen, or may be an input performed by a user in the left area of a screen, or may be an input performed by a user in the right screen area.

In this embodiment of the present disclosure, the first type of image may be a horizontal screen image or a vertical screen image. In some embodiments, the first type of image may be a favorite image, a non-favorite image, or all images. In some embodiments, the first type of image may be a dynamic image, a static image, or a video image. This is not specifically limited in this embodiment of the present disclosure.

A horizontal screen image in this embodiment of the present disclosure may be an image whose width is greater than the height (for example, an aspect ratio of the image is greater than 1), and a vertical screen image may be an image whose width is less than the height (for example, an aspect ratio of the image is less than 1).

For ease of understanding, an image captured by a camera when the electronic device is in a landscape state may be referred to as a horizontal screen image, and an image captured by the camera when the electronic device is in a portrait state may be referred to as a vertical screen image.

It should be noted that, when the first type of image is a horizontal screen image or a vertical screen image, and when the first type of image is a favorite image or a non-favorite image, the first image may specifically be a dynamic image, a static image, or a video image.

S202. In response to the first input, the electronic device displays a second image in the second type of image.

A type of the first type of image is different from that of the second type of image.

Exemplarily, the first type and the second type may be a pair of different types, such as landscape screen and portrait screen; or may be two different types in a cluster of types, such as static, dynamic (picture), video; favorite, non-favorite, all.

In a case where the first type of image is a horizontal screen image, the second type of image may be a vertical screen image.

In a case where the first type of image is a vertical screen image, the second type of image may be a horizontal screen image.

In a case where the first type of image is a favorite image, the second type of image may be a non-favorite image or all images.

In a case where the first type of image is a non-favorite image, the second type of image may be a favorite image or all images.

In a case where the first type of image is all images, the second type of image may be a non-favorite image or a favorite image.

In a case where the first type of image is a static image, the second type of image may be a video image or a dynamic image.

In a case where the first type of image is a dynamic image, the second type of image may be a video image or a static image.

In a case where the first type of image is a video image, the second type of image may be a dynamic image or a static image.

For example, in this embodiment of the present disclosure, both the first type of image and the second type of image may belong to a target image set.

Exemplarily, the target image set may be an album, and the album may be an album in a gallery of the electronic device, an album in a web page, or an album in an application. In some embodiments, the target image set may be an image in a social state, for example, images in the target image set include an image from user-posted information.

It should be noted that, in this embodiment of the present disclosure, it is assumed that both the first image and the second image are images in a same album in the gallery, and the images in the album may be arranged in an order of shooting time, the size of the images, or the name of the images, which is not specifically limited in this embodiment of the present disclosure.

It can be understood that the second image is an image, belonging to a second type of image and arranged closest to the first image, in an album, or may be an image, belonging to a second type of image and displayed closest to the first image, in an album.

In some embodiments, the second image may be an image, displayed before the first image, in the second type of image, or may be an image displayed after the first image, in the second type of image, which is not specifically limited in this embodiment of the present disclosure.

Specifically, it is assumed that the user is browsing photos in an album in the gallery of the electronic device. When the electronic device is in the portrait state, if a horizontal screen photo is browsed on the electronic device, and the user feels that a display effect of the horizontal screen photo is not good and expects to browse a vertical screen image only in a portrait mode, the user can input the first input on the screen of the electronic device to trigger the electronic device to display the vertical screen image in the album.

Exemplarily, it is assumed that an image a is a horizontal screen image, an image b is a horizontal screen image, an image c is a vertical screen image, an image d is a vertical screen image, and an image e is a horizontal screen image. If the electronic device receives the first input in a case that the image a is displayed, the electronic device may display the image c (an image, in vertical screen images, displayed closest to the image a). If the electronic device receives the first input in a case that the image c is displayed, the electronic device may display the image b (an image, in horizontal screen images prior to the image c, displayed closest to the image b) or display the image e (an image, in the horizontal screen images following the image c, displayed closest to the image b).

S203. The electronic device receives a second input from the user.

The second input is an input for the user to trigger the electronic device to display a next image in the second type of image.

S204: In response to the second input, the electronic device displays a third image.

The third image is an image, adjacent to the second image, in the second type of image.

For example, the third image is an image, belonging to the second type of image and adjacent to the second image, in a target image set.

In some embodiments, the third image may be an image prior to the second image, or may be an image following the second image.

It can be understood that, in a case where the third image is an image before the second image, if the user inputs the second input n (n≥2) times, the electronic device may display the $(n-1)^{th}$ second type of image prior to the third image; and in a case where the third image is an image following the second image, if the user inputs the second input n times, the electronic device may display the $(n-1)^{th}$ second type of image following the third image.

It can be understood that, because the electronic device displays the image adjacent to the second image in response to the second input from the user, it may be determined that the first input is an input for the user to trigger the electronic device to display only the second type of image, that is, the user may control, through the first input, the electronic device to display only the second type of image when the first type of image is displayed.

Exemplarily, to facilitate the understanding of the display method of the embodiment of the present disclosure, in a case that a horizontal screen image is currently viewed on the electronic device, the user may control, through the first input, the electronic device to display a vertical screen image, and may continue to browse another vertical screen image through the second input. In a case that a vertical screen image is currently viewed on the electronic device, the user may control, through the first input, the electronic device to display a horizontal screen image, and may continue to browse another horizontal screen image through the second input.

According to the display method provided in this embodiment of the present disclosure, first, an electronic device receives a first input from a user in a case that a first image in a first type of image is displayed; and in response to the first input, the electronic device may display a second image in a second type of image. Then, the electronic device receives a second input from the user, and in response to the second input, the electronic device displays a third image. A type of the first type of image is different from that of the second type of image, and the third image is an image, adjacent to the second image, in the second type of image. Therefore, the electronic device may be triggered through the first input to display the second type of image, so that during browsing of images, if the second type of image needs to be viewed separately, the electronic device may be triggered through the first input to display the second type of image. For example, when a user browses images, if the user only wants to browse horizontal screen images when browsing images, and a vertical screen image is currently displayed, the electronic device may be triggered to continuously display horizontal screen images; and if the user only wants to browse vertical screen images when browsing images, and a horizontal screen image is currently displayed, the electronic device may be triggered to continuously display vertical screen images. In this way, the user can quickly browse the horizontal screen images when the electronic device is in a landscape state (automatic rotation is turned on), and the user can quickly browse the vertical screen images when the electronic device is in a portrait state. A display manner is more flexible, improving user's experience of browsing images.

For example, in this embodiment of the present disclosure, the first type of image and the second type of image both belong to a target image set, and the second image may be an image, belonging to the second type of image and arranged closest to the first image, in the target image set.

Based on this solution, the electronic device may display, based on the first input from the user, an image, belonging to the second type of image and arranged closest to the first image, in the target image set. For example, when images are arranged in an order of shooting time, it is convenient for the user to quickly locate an image belonging to the second type of image and closest to the first image in shooting time, and the user does not need to start image browsing from the first image of the second type of image, which is convenient for the user to find a second type of image related to the first image, so that the user browses images more convenient.

For example, in this embodiment of the present disclosure, the electronic device may determine, based on a relationship between a first input attribute of the first input and a first input attribute of the second input, whether the third image is an image, in the second type of image, prior to or following the second image. The first input attribute may be a type of input, a direction of input, a position of input, and a number of times of input.

Exemplarily, the first input may be a type of slide input or a type of tap input. For example, the first input may be an input of sliding in a first direction, and the second input may be an input of sliding in a second direction; the first input may be an input of tapping a screen a plurality of times, and the second input may be an input of tapping the screen once; the first input may be an input of tapping a screen at a first position a plurality of times, and the second input may be an input of tapping a screen at a second position a plurality of times; and the first input may be an input of double-tapping at a first position, and the second input may be an input of double-tapping at a second location.

Specifically, in a case where the first position may be a position in the top area of the screen, the second position may be a position in the top area of the screen, or may be a position in the bottom area of the screen; and in a case where the first position may be a position in the left area of a screen, the second position may be a position in the left area of the screen or may be a position in the right area of the screen.

For example, in this embodiment of the present disclosure, both the first input and the second input are slide inputs performed on the screen, and the second input may be an input with an input direction being parallel to an input direction of the first input.

Exemplarily, if the first input is an input of sliding up performed by the user along a screen of the electronic device, the second input may be an input of sliding up performed by the user along the screen of the electronic device, or may be an input of sliding down performed by the user along the screen of the electronic device. If the first input is an input of leftward sliding performed by the user along a screen of the electronic device, the second input may be an input of leftward sliding performed by the user along the screen of the electronic device, or may be an input of rightward sliding performed by the user along the screen of the electronic device. If the first input is an input of leftward sliding performed by the user on a screen with two fingers, the second input may be an input of leftward sliding performed by the user on the screen with two fingers, or may be an input of rightward sliding performed by the user on the screen with two fingers.

It should be noted that, in this embodiment of the present disclosure, the first input may be used to trigger the electronic device to display an image, belonging to the second type of image and arranged closest to the first image, in the target image set. The second image may be an image displayed before the first image, or may be an image displayed after the first image. The user may control, through an input direction of the first input, whether the second image displayed by the electronic device is an image prior to the first image or an image following the first image.

Exemplarily, a slide input performed by the user on a screen from top to bottom may trigger the electronic device to display the first second type of image prior to the currently displayed first type of image; and a slide input performed by the user on the screen from bottom to top may trigger the electronic device to display the first second type of image following the currently displayed first type of image.

It should be noted that, an example in which the first input is an input of sliding from top to bottom to trigger the electronic device to display the second image prior to the first image is used above for description. In practical application, users may adjust, according to their own habits, the first input to be an input of sliding from top to bottom to trigger the electronic device to display the second image following the first image, which is not specifically limited in this embodiment of the present disclosure.

In this embodiment of the present disclosure, an arrangement relationship between the third image and the second image may be determined depending on whether attributes of the second input and the first input are the same, and specifically there may be the following two implementations:

A first possible implementation is as follows:

The second image is the image arranged before the first image. If the first input attribute of the second input is the same as that of the first input, the third image is an image, arranged before the second image, in the second type of image. If the first input attribute of the second input is different from that of the first input, the third image is an image, arranged after the second image, in the second type of image.

For example, in a case where the first input attribute is an input direction, if an input direction of the second input is the same as that of the first input, the third image is an image, arranged before the second image, in the second type of image; if an input direction of the second input is opposite to that of the first input, the third image is an image, arranged after the second image, in the second type of image. In a case where the first input attribute is an input position, if an input position of the second input is the same as that of the first input, the third image is an image, arranged before the second image, in the second type of image; if an input position of the second input is opposite to that of the first input, the third image is an image, arranged after the second image, in the second type of image.

Example 1-1: In a case that the electronic device displays an image 1-1 (a horizontal screen image), assuming that the electronic device is in the portrait state, and the first input is a slide input performed on a screen from top to bottom, an image 2-1 (a vertical screen image) displayed by the electronic device may be the closest vertical screen image, arranged before the image 1-1, in vertical screen images in the gallery. In a case that the image 2-1 is displayed and the second input is a slide input performed on a screen from top to bottom (that is, the direction of the second input is the same as the input direction of the first input), an image 3-1 displayed by the electronic device is the closest vertical screen image, arranged before the image 2-1, in the vertical screen images in the gallery. In a case that the image 2-1 is displayed and the second input is a slide input performed on a screen from bottom to top (that is, the direction of the second input is opposite to the input direction of the first input), an image 4-1 displayed by the electronic device is the closest vertical screen image, arranged after the image 2-1, in the vertical screen images in the gallery.

Example 1-2: In a case that the electronic device displays an image 1-2 (a vertical screen image), assuming that the electronic device is in the landscape state, and the first input is a slide input performed on a screen from top to bottom, an image 2-2 (a horizontal screen image) displayed by the electronic device is the closest horizontal screen image, arranged before the image 1-2, in horizontal screen images in the gallery. In a case that the image 2-2 is displayed and the second input is a slide input performed on a screen from top to bottom (that is, the direction of the second input is the same as the input direction of the first input), an image 3-2 displayed by the electronic device is the closest horizontal screen image, arranged before the image 2-2, in the horizontal screen images in the gallery. In a case that the image 2-2 is displayed and the second input is a slide input performed on a screen from bottom to top (that is, the direction of the second input is opposite to the input direction of the first input), an image 4-2 displayed by the electronic device is the closest horizontal screen image, arranged after the image 2-2, in the horizontal screen images in the gallery.

Example 1-3: In a case that the electronic device displays an image 1-3 (a non-favorite image), and the first input is a slide input performed on a screen from top to bottom, an image 2-3 (a favorite image) displayed by the electronic device is the closest favorite image, arranged before the image 1-3, in favorite images in the gallery. In a case that the image 2-3 is displayed and the second input is a slide input performed on a screen from top to bottom (that is, the direction of the second input is the same as the input direction of the first input), an image 3-3 displayed by the electronic device is the closest favorite image, arranged before the image 2-3, in the favorite images in the gallery. In a case that the image 2-3 is displayed and the second input is a slide input performed on a screen from bottom to top (that is, the direction of the second input is opposite to the input direction of the first input), an image 4-3 displayed by the electronic device is the closest favorite image, arranged after the image 2-3, in the favorite images in the gallery.

It should be noted that, an example in which the first input is a slide input is only used above for description, and an operation manner of a tap input is similar to that of the slide input, and details are not repeated herein.

Based on this solution, the electronic device may be triggered, based on the first input from the user, to display the second image, and in combination with the first input attribute, such as the input direction or the input position, of the second input and the first input, it may be determined whether the third image viewed by the user through the second input is the image arranged before the second image or the image arranged after the second image, so that the display manner is relatively flexible.

A second possible implementation is as follows:

In a case where the second image is an image arranged after the first image, if the first input attribute of the second input is the same as that of the first input, the third image is an image, arranged after the second image, in the second type of image; if the first input attribute of the second input is different from that of the first input, the third image is an image, arranged before the second image, in the second type of image.

For example; in a case where the first input attribute is an input direction, if an input direction of the second input is the same as that of the first input, the third image is an image, arranged after the second image, in the second type of image; if an input direction of the second input is opposite to that of the first input, the third image is an image, arranged before the second image, in the second type of image. In a case where the first input attribute is an input position, if an input position of the second input is the same as that of the first input, the third image is an image, arranged after the second image, in the second type of image; if an input position of the second input is opposite to that of the first input, the third image is an image, arranged before the second image, in the second type of image.

Example 2-1: In a case that the electronic device displays an image 1-4 (a horizontal screen image), assuming that the electronic device is in the portrait state, and the first input is a slide input performed on a screen from top to bottom, an image 2-4 (a vertical screen image) displayed by the electronic device is the closest vertical screen image, arranged after the image 1-4, in vertical screen images in the gallery. In a case that the image 2-4 is displayed and the second input is a slide input performed on a screen from top to bottom (that is, the direction of the second input is the same as the input direction of the first input), an image 3-4 displayed by the electronic device is the closest vertical screen image, arranged after the image 2-4, in the vertical screen images in the gallery. In a case that the image 2-4 is displayed for the user and the second input is a slide input performed on a screen from bottom to top (that is, the direction of the second input is opposite to the input direction of the first input), an image 4-4 displayed by the electronic device is the closest vertical screen image, arranged before the image 2-4, in the vertical screen images in the gallery.

Example 2-2: In a case that the electronic device displays an image 1-5 (a vertical screen image), assuming that the electronic device is in the landscape state, and the first input is a slide input performed on a screen from top to bottom, an image 2-5 (a horizontal screen image) displayed by the electronic device may be the closest horizontal screen image, arranged after the image 1-5, in horizontal screen images in the gallery. In a case that the image 2-5 is displayed for the user and the second input is a slide input performed on a screen from top to bottom (that is, the direction of the second input is the same as the input direction of the first input), an image 3-5 displayed by the electronic device is the closest horizontal screen image, arranged after the image 2-5, in the horizontal screen images in the gallery. In a case that the image 2-5 is displayed for the user and the second input is a slide input performed on a screen from bottom to top (that is, the direction of the second input is opposite to the input direction of the first input), an image 4-5 displayed by the electronic device is the closest horizontal screen image, arranged before the image 2-5, in the horizontal screen images in the gallery.

Example 2-3: In a case that the electronic device displays an image 1-6 (a non-favorite image), and the first input is a slide input performed on a screen from top to bottom, an image 2-6 (a favorite image) displayed by the electronic device is the closest favorite image arranged after the image 1-6. In a case that the image 2-6 is displayed for the user and the second input is a slide input performed on a screen from top to bottom (that is, the direction of the second input is the same as the input direction of the first input), an image 3-6 displayed by the electronic device is the closest favorite image, arranged after the image 2-6, in the favorite images in the gallery. In a case that the image 2-6 is displayed and the second input is a slide input performed on a screen from bottom to top (that is, the direction of the second input is opposite to the input direction of the first input), an image 4-6 displayed by the electronic device is the closest favorite image, arranged before the image 2-6, in the favorite images in the gallery.

Based on this solution, the electronic device may be triggered, based on the first input from the user, to display the second image, and in combination with the input directions of the second input and the first input, whether the third image viewed by the user through the second input is the image arranged before the second image or the image arranged after the second image is determined, so that the display manner is relatively flexible.

For example, after S204, the display method provided by the embodiments of the present disclosure may further include S205 and S206 as follows.

S205. An electronic device receives a third input from the user in a case that a fourth image in the second type of image is displayed.

The third input is an input corresponding to the first type of image. In other words, the third input is an input that triggers the electronic device to display the first type of image.

Exemplarily, in a case where the first input is a slide input performed from bottom to top, the third input may be a slide input performed from top to bottom; in a case where the first input is a two-finger slide input, the third input may be a one-finger slide input.

S206. In response to the third input, the electronic device displays a fifth image in the first type of image.

The fifth image is an image, belonging to the first type of image and arranged closest to the fourth image, in the target image set.

Specifically, a sequence relationship between the fifth image and the fourth image may be related to the directions of the third input and the first input. For details, reference may be made to the description of the relationship between the third image and the second image in the foregoing embodiments, and details are not repeated herein.

Exemplarily, assuming that the first type of image is a non-favorite image, the user may trigger, through the first input, the electronic device to display a favorite image, and then the user views another favorite image as needed. For example, after viewing a favorite image 1, if the user wants to view another image close to the favorite image in shooting time, the user may trigger the electronic device to display the non-favorite image. In this case, the non-favorite image arranged closest to the favorite image 1 is displayed. The user may continue to browse another image close to the favorite image 1.

Based on this solution, the user may trigger, through the first input, the electronic device to display the second type of image, and the user first searches for a second type of image in the second type of image. If the user wants to browse an image, belonging to the first type of image and arranged adjacent to the second type of image, in the target image set, the user may trigger, through the third input, the electronic device to display an image, belonging to the first type of image and arranged closest to the fourth image, in the target image set, so that the user performs screening conveniently and a speed of the user to find an image is improved.

For example, after S204, the display method provided by the embodiments of the present disclosure may further include S207 and S208 as follows.

S207: The electronic device receives a fourth input of the user in a case that a six image in the second type of image is displayed.

The fourth input may be an input corresponding to the first type of image. In other words, the fourth input is an input that triggers the electronic device to display the first type of image.

S208. In response to the fourth input, the electronic device displays a seventh image in the first type of image.

The seventh image is a first image or an image adjacent to the first image.

Exemplarily, a favorite image and a non-favorite image are used as an example. Assuming that an image a (namely, the first image) is a non-favorite image, the user may trigger, through the first input, the electronic device to display a favorite image, and then the user views another favorite image, for example, an image b (the sixth image) as needed. After that, if the user wants to view a non-favorite image, the user may trigger the electronic device to display the non-favorite image. In this case, the non-favorite image a is displayed, or a non-favorite image adjacent to the non-favorite image a is displayed.

Based on this solution, the user may trigger, through the first input, the electronic device to display the second type of image, and the user first searches for a second type of image in the second type of image. If the user wants to re-browse the first type of image, the user may trigger, through the third input, the electronic device to display the first image or an image adjacent to the first image in the target image set, so that the user performs screening conveniently, a viewing mode is more flexible, and a speed of the user to find an image is improved.

For example, after S204, the display method provided by the embodiments of the present disclosure may further include the following steps:

When the user triggers the electronic device to display a next image, and in a case where a currently displayed image is the last image in the second type of image, the electronic device may prompt the user that the currently displayed image is the last image in the second type of image, and further operation is invalid; or the electronic device may prompt the user that the currently displayed image is the last image in the second type of image, and further operation is to display a next type of image (for example, the first type of image); or the electronic device may prompt the user that the currently displayed image is the last image in the second type of image, and further operation is to display the first image in the second type of image (namely, loop display).

When the user triggers the electronic device to display a previous image, and in a case where a currently displayed image is the first image in the second type of image, the electronic device may prompt the user that the currently displayed image is the first image in the second type of image, and further operation is invalid; or the electronic device may prompt the user that the currently displayed image is the first image in the second type of image, and further operation is to display a previous type of image (for example, the first type of image); or the electronic device may prompt the user that the currently displayed image is the first image in the second type of image, and further operation is to display the last image in the second type of image (namely, loop display).

It should be noted that the above is only an exemplary description. In practical application, the user may set as required a subsequent operation after the first image in a type of image or a second image is browsed, which is not specifically limited in this embodiment of the present disclosure.

Based on this solution, different display manners may be adopted in a process of browsing images by the user, the display manner is more flexible, and user experience is better.

Figure 3:
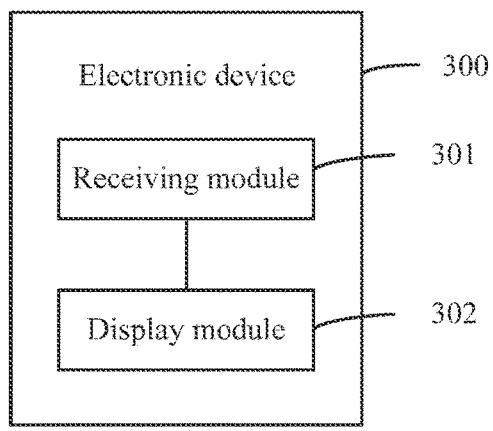
FIG. 3 is a possible schematic structural diagram of an electronic device according to an embodiment of the present disclosure.

FIG. 3 is a possible schematic structural diagram of an electronic device according to an embodiment of the present disclosure. As shown in FIG. 3, an electronic device 300 includes a receiving module 301 and a display module 302. The receiving module 301 is configured to receive a first input from a user in a case that a first image in a first type of image is displayed. The display module 302 is configured to: in response to the first input received by the receiving module 301, display a second image in a second type of image, where a type of the first type of image is different from that of the second type of image. The receiving module 301 is further configured to receive a second input from the user. The display module 302 is further configured to: in response to the second input received by the receiving module 301, display a third image, where the third image is an image, adjacent to the second image, in the second type of image.

In some embodiments, the first type of image and the second type of image both belong to a target image set, and the second image is an image, belonging to the second type of image and arranged closest to the first image, in the target image set.

In some embodiments, the second input is an input with an input direction being parallel to an input direction of the first input.

In some embodiments, the second image is an image arranged before the first image in the target image set. If a first input attribute of the second input is the same as that of the first input, the third image is an image, arranged before the second image, in the second type of image. If the first input attribute of the second input is different from that of the first input, the third image is an image, arranged after the second image, in the second type of image; or the second image is an image, arranged after the first image, in the target image set. If the first input attribute of the second input is the same as that of the first input, the third image is an image, arranged after the second image, in the second type of image. If the first input attribute of the second input is different from that of the first input, the third image is an image, arranged before the second image, in the second type of image.

In some embodiments, the receiving module 301 is further configured to receive, after the display module 302 displays the third image, a third input from the user in a case that a fourth image in the second type of image is displayed. The display module 302 is further configured to: in response to the third input received by the receiving module 301, display a fifth image in the first type of image, where the fifth image is an image, belonging to the first type of image and arranged closest to the fourth image, in the target image set.

In some embodiments, the receiving module 301 is further configured to receive, after the display module 302 displays the third image, a fourth input from the user in a case that a sixth image in the second type of image is displayed. The display module 302 is further configured to display a seventh image in the first type of image, where the seventh image is the first image or an image adjacent to the first image.

In some embodiments, the first type of image includes all images in the target image set, and the second type of image includes an image that has been collected in the target image set; or the first type of image includes an image that has been collected in the target image set, and the second type of image includes all images in the target image set.

The electronic device 300 provided in this embodiment of the present disclosure can implement the processes that are implemented by the electronic device in the foregoing method embodiments, To avoid repetition, details are not described herein again.

The embodiment of the present disclosure provides an electronic device. First, an electronic device receives a first input from a user in a case that a first image in a first type of image is displayed; and in response to the first input, the electronic device may display a second image in a second type of image. Then, the electronic device receives a second input from the user, and in response to the second input, the electronic device displays a third image. A type of the first type of image is different from that of the second type of image, and the third image is an image, adjacent to the second image, in the second type of image. Therefore, the electronic device may be triggered through the first input to display the second type of image, so that during browsing of images, if the second type of image needs to be viewed separately, the electronic device may be triggered through the first input to display the second type of image. For example, when a user browses images, if the user only wants to browse horizontal screen images when browsing images, and a vertical screen image is currently displayed, the electronic device may be triggered to continuously display horizontal screen images; and if the user only wants to browse vertical screen images when browsing images, and a horizontal screen image is currently displayed, the electronic device may be triggered to continuously display vertical screen images. In this way, the user can quickly browse the horizontal screen images when the electronic device is in a landscape state (automatic rotation is turned on), and the user can quickly browse the vertical screen images when the electronic device is in a portrait state. A display manner is more flexible, improving user's experience of browsing images.

Figure 4:
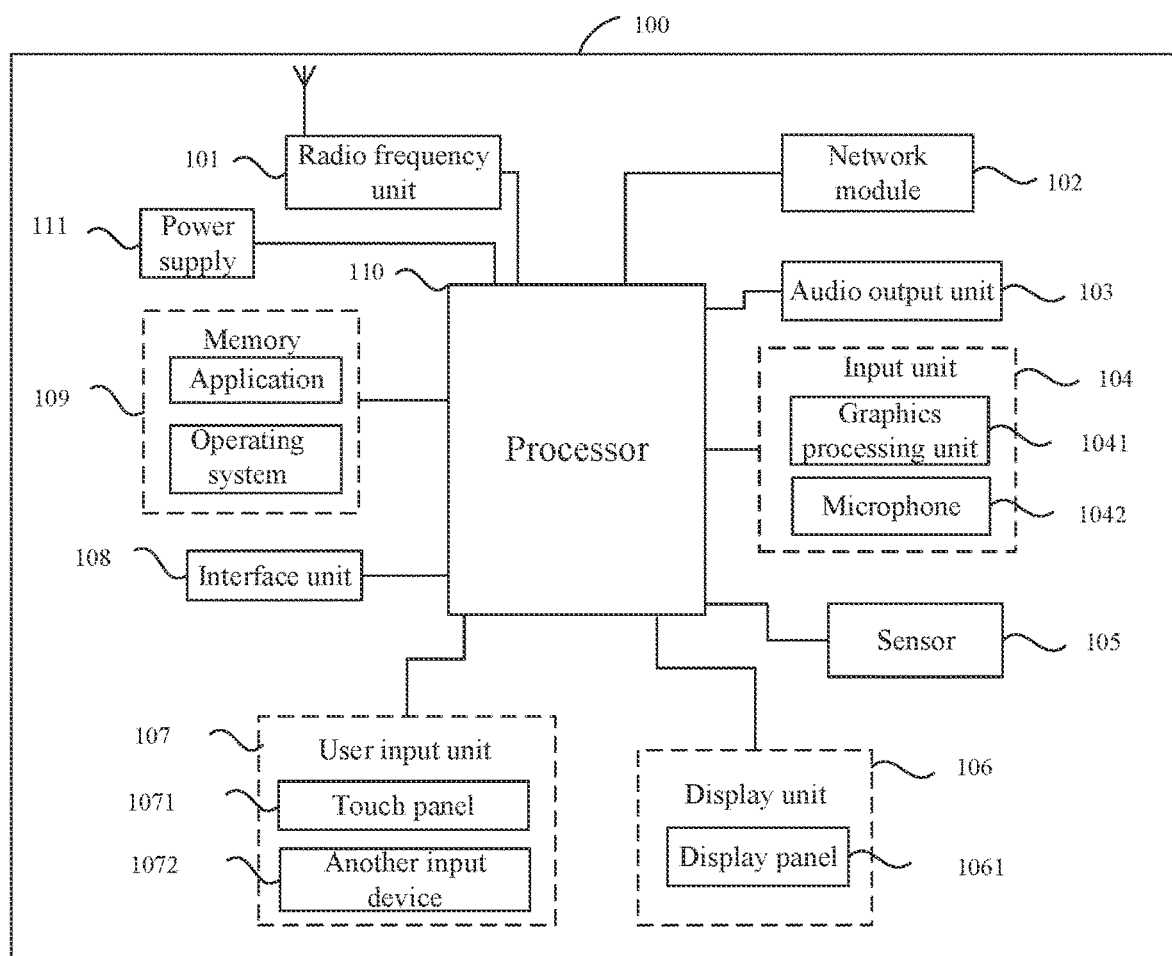
FIG. 4 is a schematic diagram of hardware of an electronic device according to an embodiment of the present disclosure.

FIG. 4 is a schematic diagram of hardware of an electronic device according to an embodiment of the present disclosure. The electronic device 100 includes, but not limited to: a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device shown in FIG. 4 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The user input unit 107 is configured to receive a first input from a user in a case that a first image in a first type of image is displayed. The display unit 106 is configured to: in response to the first input, display a second image in a second type of image, where a type of the first type of image is different from that of the second type of image. The user input unit 107 is configured to receive a second input from the user. The display unit 106 is configured to: in response to the second input, display a third image, where the third image is an image, belonging to the second type of image and adjacent to the second image, in a target image set.

The embodiment of the present disclosure provides an electronic device. First, an electronic device receives a first input from a user in a case that a first image in a first type of image is displayed; and in response to the first input, the electronic device may display a second image in a second type of image. Then, the electronic device receives a second input from the user, and in response to the second input, the electronic device displays a third image. A type of the first type of image is different from that of the second type of image, and the third image is an image, adjacent to the second image, in the second type of image. Therefore, the electronic device may be triggered through the first input to display the second type of image, so that during browsing of images, if the second type of image needs to be viewed separately, the electronic device may be triggered through the first input to display the second type of image. For example, when a user browses images, if the user only wants to browse horizontal screen images when browsing images, and a vertical screen image is currently displayed, the electronic device may be triggered to continuously display horizontal screen images; and if the user only wants to browse vertical screen images when browsing images, and a horizontal screen image is currently displayed, the electronic device may be triggered to continuously display vertical screen images. In this way, the user can quickly browse the horizontal screen images when the electronic device is in a landscape state automatic rotation is turned on), and the user can quickly browse the vertical screen images when the electronic device is in a portrait state. A display manner is more flexible, improving user's experience of browsing images.

It should be understood that in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and transmits uplink data to the base station. Generally, the radio frequency unit 101 includes, but is not limited to, an antenna, at least one amplifier, a transceiver, a coupler, a low noise amplifier, and a duplexer. In addition, the radio frequency unit 101 may also communicate with a network and other devices through a wireless communication system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal and output the audio signal as a sound. Moreover, the audio output unit 103 may further provide audio output related to a specific function performed by the electronic device 100 (for example, call signal receiving sound and message receiving sound). The audio output unit 103 includes a speaker, a buzzer, a telephone receiver, and the like.

The input unit 104 is configured to receive audio or video signals. The input unit 104 may include a Graphics Processing Unit (GPU) 1041 and a microphone 1042. The graphics processing unit 1041 is configured to process image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process such sound into audio data. The audio data obtained through processing may be converted, in a telephone call mode, into a format that may be sent to a mobile communication base station via the radio frequency unit 101 for output.

The electronic device 100 further includes at least one sensor 105, for example, a light sensor, a motion sensor, and another sensor, Specifically, the light sensor includes an ambient light sensor and a proximity sensor. The ambient light sensor may adjust brightness of a display panel 1061 according to ambient light brightness. The proximity sensor may switch off the display panel 1061 and/or backlight when the electronic device 100 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 106 is configured to display information entered by the user or information provided for the user. The display unit 106 may include the display panel 1061, and the display panel 1061 may be configured in a form of a Liquid Crystal Display (LCD), an Organic Light-Emitting Diode (OLED), or the like.

The user input unit 107 may be configured to receive entered number or character information, and generate key signal input related to user settings and function control of the electronic device. Specifically, the user input unit 107 includes a touch panel 1071 and another input device 1072. The touch panel 1071 is also referred to as a touchscreen, and may collect a touch operation of the user on or near the touch panel 1071 (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by various types such as a resistive type, a capacitive type, an infrared ray type or a surface acoustic wave type. In addition to the touch panel 1071, the user input unit 107 may further include another input device 1072. Specifically, the another input device 1072 may include but is not limited to: a physical keyboard, a function key (such as a volume control key, a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 4, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 108 is an interface for connecting an external apparatus and the electronic device 100. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 108 may be configured to receive input from an external apparatus (for example, data information and power) and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application required by at least one function (for example, a sound play function or an image display function), and the like. The data storage area may store data (for example, audio data or a phone book) or the like created based on use of the mobile phone. In addition, the memory 109 may include a high-speed random access memory or a nonvolatile memory, for example, at least one disk storage device, a flash memory, or other volatile solid-state storage devices.

The processor 110 is a control center of the electronic device and connects all parts of the electronic device using various interfaces and circuits. By running or executing software programs and/or modules stored in the memory 109 and by calling data stored in the memory 109, the processor 110 implements various functions of the electronic device and processes data, thus performing overall monitoring on the electronic device. The processor 110 may include one or more processing units. In some embodiments, the processor 110 may integrate an application processor and a modem processor. The application processor mainly deals with an operating system, a user interface, an application, and the like. The modem processor mainly deals with wireless communication. It may be understood that the modem processor may not be integrated into the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some functional modules not shown. Details are not described herein again.

For example, an embodiment of the present disclosure further provides an electronic device. With reference to FIG. 4, the electronic device includes a processor 110, a memory 109, and a computer program that is stored in the memory 109 and capable of running on the processor 110. When the processor 110 executes the computer program, the processes of the foregoing display method embodiment are implemented and a same technical effect can be achieved. To avoid repetition, details are not described herein again.

An embodiment of the present disclosure further provides a computer-readable storage medium. A computer program is stored in the computer-readable storage medium. When the computer program is executed by a processor, processes of the foregoing embodiments of the display method can be implemented, and a same technical effect can be achieved. To avoid repetition, details are not described herein. The computer-readable storage medium is, for example, a Read-Only Memory (ROM), a Random Access Memory (RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these elements, but also includes other elements not expressly listed, or also include elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. A display method, performed by an electronic device, comprising:
   receiving a first input from a user when a first image in a first type of image is displayed;
   in response to the first input, displaying a second image in a second type of image, wherein the first image and the second image belong to a target image set, wherein the first type of image is different from the second type of image in at least one of an orientation of the image, a user preference on the image, or a dynamic nature of the image;
   receiving a second input from the user; and
   in response to the second input, displaying a third image, wherein the third image is an image closest, to the second image in the target image set that is also in the second type of image.

2. The method according to claim 1, wherein the second image is an images closest to the first image in the target image set that is in the second type of image.

3. The method according to claim 2, wherein the second image is an image, arranged before the first image, in the target image set, and
   when a first input attribute of the second input is the same as that of the first input, the third image is an image, arranged before the second image, in the target image set;
   when the first input attribute of the second input is different from that of the first input, the third image is an image, arranged after the second image, in the target image set; or
   the second image is an image, arranged after the first image, in the target image set, and
   when the first input attribute of the second input is the same as that of the first input, the third image is an image, arranged after the second image, in the target image set;
   when the first input attribute of the second input is different from that of the first input, the third image is an image, arranged before the second image, in the target image set.

4. The method according to claim 2, wherein after the displaying the third image, the method further comprises:
   receiving a third input from the user when a fourth image in the second type of image is displayed; and
   in response to the third input, displaying a fifth image in the first type of image, wherein the fifth image is an image closest to the fourth image in the target image set that is in the first type of image.

5. The method according to claim 2, wherein the first type of image comprises all images in the target image set, and the second type of image comprises an image that has been marked as a favorite image in the target image set; or
   the first type of image comprises an image that has been marked as the favorite image in the target image set, and the second type of image comprises all images in the target image set.

6. The method according to claim 1, wherein after the displaying the third image, the method further comprises:
   receiving a fourth input from the user when a sixth image in the second type of image is displayed; and
   in response to the fourth input, displaying a seventh image in the first type of image, wherein the seventh image is the first image in the target image set or an image closest to the first image in the target image set that is in the first type of image.

7. The method according to claim 1, wherein:
   when the first type of image is a horizontal screen image, the second type of image is a vertical screen image; or
   when the first type of image is a vertical screen image, the second type of image is a horizontal screen image.

8. The method according to claim 1, wherein:
   when the first type of image is a static image, the second type of image is a video image or a dynamic image;
   when the first type of image is a dynamic image, the second type of image is a video image or a static image; or
   when the first type of image is a video image, the second type of image is a dynamic image or a static image.

9. An electronic device, comprising:
   a memory storing computer-readable instructions; and
   a processor coupled to the memory and configured to execute the computer-readable instructions, wherein the computer-readable instructions, when executed by the processor, cause the processor to perform operations comprising:
   receiving a first input from a user when a first image in a first type of image is displayed;
   in response to the first input, displaying a second image in a second type of image, wherein the first image and the second image belong to a target image set, wherein the first type of image is different from the second type of image in at least one of an orientation of the image, a user preference on the image, or a dynamic nature of the image;
   receiving a second input from the user; and
   in response to the second input, displaying a third image, wherein the third image is an image closest to the second image in the target image set that is also in the second type of image.

10. The electronic device according to claim 9, wherein the second image is an image closest to the first image in the target image set that is in the second type of image.

11. The electronic device according to claim 10, wherein the second image is an image, arranged before the first image, in the target image set, and
    when a first input attribute of the second input is the same as that of the first input, the third image is an image, arranged before the second image, in the target image set;
    when the first input attribute of the second input is different from that of the first input, the third image is an image, arranged after the second image, in the target image set; or
    the second image is an image, arranged after the first image, in the target image set, and
    when the first input attribute of the second input is the same as that of the first input, the third image is an image, arranged after the second image, in the target image set;
    when the first input attribute of the second input is different from that of the first input, the third image is an image, arranged before the second image, in the target image set.

12. The electronic device according to claim 10, wherein after the displaying the third image, the operations further comprise:
    receiving a third input from the user when a fourth image in the second type of image is displayed; and in response to the third input, displaying a fifth image in the first type of image, wherein the fifth image is an image closest to the fourth image in the target image set that is in the first type of image.

13. The electronic device according to claim 10, wherein the first type of image comprises all images in the target image set, and the second type of image comprises an image that has been marked as a favorite image in the target image set; or
the first type of image comprises an image that has been marked as the favorite image in the target image set, and the second type of image comprises all images in the target image set.

14. The electronic device according to claim 9, wherein after the displaying the third image, the operations further comprise:
receiving a fourth input from the user when a sixth image in the second type of image is displayed; and
in response to the fourth input, displaying a seventh image in the first type of image, wherein the seventh image is the first image in the target image set or an image closest to the first image in the target image set that is in the first type of image.

15. A non-transitory computer-readable medium, wherein the non-transitory computer-readable medium storing instructions that, when executed by a processor, cause the processor to perform:
receiving a first input from a user when a first image in a first type of image is displayed;
in response to the first input, displaying a second image in a second type of image, wherein the first image and the second image belong to a target image set, wherein the first type of image is different from the second type of image in at least one of an orientation of the image, a user preference on the image, or a dynamic nature of the image;
receiving a second input from the user; and
in response to the second input, displaying a third image, wherein the third image is an image closest to the second image in the target image set that is also in the second type of image.

16. The non-transitory computer-readable medium according to claim 15, wherein the second image is an image closest to the first image in the target image set that is in the second type of image.

17. The non-transitory computer-readable medium according to claim 16, wherein the second image is an image, arranged before the first image, in the target image set, and
when a first input attribute of the second input is the same as that of the first input, the third image is an image, arranged before the second image, in the target image set;
when the first input attribute of the second input is different from that of the first input, the third image is an image, arranged after the second image, in the target image set; or
the second image is an image, arranged after the first image, in the target image set, and
when the first input attribute of the second input is the same as that of the first input, the third image is an image, arranged after the second image, in the target image set;
when the first input attribute of the second input is different from that of the first input, the third image is an image, arranged before the second image, in the target image set.

18. The non-transitory computer-readable medium according to claim 16, wherein the instructions, when executed by the processor, causes the processor to further perform:
receiving a third input from the user when a fourth image in the second type of image is displayed; and
in response to the third input, displaying a fifth image in the first type of image, wherein the fifth image is an image closest to the fourth image in the target image set that is in the first type of image.

19. The non-transitory computer-readable medium according to claim 16, wherein the first type of image comprises all images in the target image set, and the second type of image comprises an image that has been marked as a favorite image in the target image set; or
the first type of image comprises an image that has been marked as the favorite image in the target image set, and the second type of image comprises all images in the target image set.

20. The non-transitory computer-readable medium according to claim 15, wherein the instructions, when executed by the processor, causes the processor to further perform:
receiving a fourth input from the user when a sixth image in the second type of image is displayed; and
in response to the fourth input, displaying a seventh image in the first type of image, wherein the seventh image is the first image in the target image set or an image closest to the first image in the target image set that is in the first type of image.

* * * * *